United States Patent
Chen et al.

(10) Patent No.: US 9,923,465 B2
(45) Date of Patent: Mar. 20, 2018

(54) POWER CONVERSION CIRCUIT AND ASSOCIATED OPERATING METHOD

(71) Applicant: MEDIATEK Inc., Hsin-Chu (TW)

(72) Inventors: Tso-Min Chen, Hsinchu (TW); Chien-Wei Kuan, Zhubei (TW); Yen-Hsun Hsu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/461,559

(22) Filed: Mar. 17, 2017

(65) Prior Publication Data

US 2018/0054121 A1 Feb. 22, 2018

Related U.S. Application Data

(60) Provisional application No. 62/375,509, filed on Aug. 16, 2016.

(51) Int. Cl.
| | | |
|---|---|---|
| *H02M 3/158* | (2006.01) | |
| *H02M 1/08* | (2006.01) | |
| *H02M 1/00* | (2006.01) | |

(52) U.S. Cl.
CPC ............ *H02M 3/158* (2013.01); *H02M 1/08* (2013.01); *H02M 2001/0009* (2013.01); *H02M 2001/0048* (2013.01)

(58) Field of Classification Search
CPC ........ H02M 1/08; H02M 3/156; H02M 3/158; H02M 2001/0048; H02M 2003/156; H02M 2003/158
See application file for complete search history.

(56) References Cited

U.S. PATENT DOCUMENTS

| | | | | |
|---|---|---|---|---|
| 7,948,221 | B2* | 5/2011 | Watanabe | H02M 3/158 307/110 |
| 8,664,926 | B2* | 3/2014 | Nakatomi | H02M 3/156 323/268 |
| 9,300,210 | B1 | 3/2016 | Lidsky et al. | |
| 2012/0206170 | A1* | 8/2012 | Kimura | H03K 17/04123 327/109 |
| 2013/0002215 | A1* | 1/2013 | Ikeda | H02M 3/158 323/271 |
| 2013/0009618 | A1* | 1/2013 | Su | H02M 3/158 323/271 |
| 2013/0119961 | A1* | 5/2013 | Okuda | H02M 3/158 323/299 |
| 2014/0117954 | A1* | 5/2014 | Wang | H02M 3/1584 323/271 |
| 2015/0061613 | A1 | 3/2015 | Kondou | |
| 2016/0072312 | A1* | 3/2016 | Ichikawa | H02M 3/1582 307/104 |

* cited by examiner

*Primary Examiner* — Matthew Nguyen

(74) *Attorney, Agent, or Firm* — McClure, Qualey & Rodack, LLP

(57) ABSTRACT

A power conversion circuit includes an input terminal, a first switching element, a second switching element, a third switching element, a fourth switching element, a capacitor; an inductor; and a controller configured to control the switching elements to be switched ON/OFF, such that a voltage at the load is regulated by repetitively (1) charging the inductor with a first current before charging the capacitor causing a second current to flow in the inductor and (2) charging the inductor with a third current before discharging the capacitor causing a fourth current to flow in the inductor.

31 Claims, 17 Drawing Sheets

Phase 0:

Phase 1:

Phase 2:

Phase 3:

Phase 4:

Phase 5:

Phase 6:

Phase 7:

Phase 0:

Phase 1:

Phase 2:

Phase 3:

Phase 4:

Phase 5:

Phase 0:

Phase 1:

Phase 2 :

Phase 3 :

Phase 4 :

Phase 5 :

Phase 0 :

Phase 1 :

US 9,923,465 B2

POWER CONVERSION CIRCUIT AND ASSOCIATED OPERATING METHOD

This application claims the benefit of U.S. provisional application Ser. No. 62/375,509, filed Aug. 16, 2016, the disclosure of which is incorporated by reference herein in its entirety.

TECHNICAL FIELD

The disclosure relates in general to power conversion circuits and the associated operating methods.

BACKGROUND

Various electronic devices such as computers and mobile phones are powered by regulated DC power sources. A power conversion circuit is used as, for example, a DC-to-DC converter that charges/discharges a capacitor by a switching operation of transistors to convert a high voltage input from a battery or another power source into a predetermined output voltage.

As electronic devices become smaller, lighter and more compact, the size and the performance of the dedicated power conversion circuits need to be improved. Increasing the switching frequency of the power conversion circuit has been one of the primary solutions provided to reduce the size and the cost of the large passive components. However, as the switching frequency of the power conversion circuit increases, the switching losses increase too.

Furthermore, the power handling performance is usually limited to the spec of the resonant components (e.g., capacitors and inductors) used in the power conversion circuit. When the size of the resonant components is reduced, the power handling performance of the power conversion circuit may be deteriorated. That is, there is a trade-off relationship between the switching frequency and the power handling performance of the power conversion circuit.

SUMMARY

The disclosure is directed to power conversion circuits and the associated operating methods.

According to one embodiment, a power conversion circuit is provided. The power conversion circuit includes an input terminal coupled to an input voltage; a first switching element having a pair of first terminals and a first control terminal, wherein the pair of first terminals is connected between the input terminal and a first node; a second switching element having a pair of second terminals and a second control terminal, wherein the pair of second terminals is connected between the first node and a second node; a third switching element having a pair of third terminals and a third control terminal, wherein the pair of third terminals is connected between the second node and a third node; a fourth switching element having a pair of fourth terminals and a fourth control terminal, wherein the pair of fourth terminals is connected between the third node and a ground; a capacitor coupled between the first node and the third node; an inductor coupled between the second node and a load; and a controller configured to control the first, second, third and fourth switching elements to be switched ON/OFF through the first, second, third and fourth control terminals, respectively, such that a voltage at the load is regulated by repetitively (1) charging the inductor with a first current before charging the capacitor causing a second current to flow in the inductor and (2) charging the inductor with a third current before discharging the capacitor causing a fourth current to flow in the inductor.

According to another embodiment, a method of operating a power conversion circuit is provided. The method includes: supplying an input voltage to the power conversion circuit, wherein the power conversion circuit includes an input terminal coupled to an input voltage; a first switching element having a pair of first terminals and a first control terminal, wherein the pair of first terminals is connected between the input terminal and a first node; a second switching element having a pair of second terminals and a second control terminal, wherein the pair of second terminals is connected between the first node and a second node; a third switching element having a pair of third terminals and a third control terminal, wherein the pair of third terminals is connected between the second node and a third node; a fourth switching element having a pair of fourth terminals and a fourth control terminal, wherein the pair of fourth terminals is connected between the third node and a ground; a capacitor coupled between the first node and the third node; an inductor coupled between the second node and a load; and a controller configured to control the first, second, third and fourth switching elements to be switched ON/OFF through the first, second, third and fourth control terminals, respectively; and changing the ON/OFF configuration of the first to fourth switching elements by the controller, such that a voltage at the load is regulated by repetitively (1) charging the inductor with a first current before charging the capacitor causing a second current to flow in the inductor and (2) charging the inductor with a third current before discharging the capacitor causing a fourth current to flow in the inductor.

Figure 1:
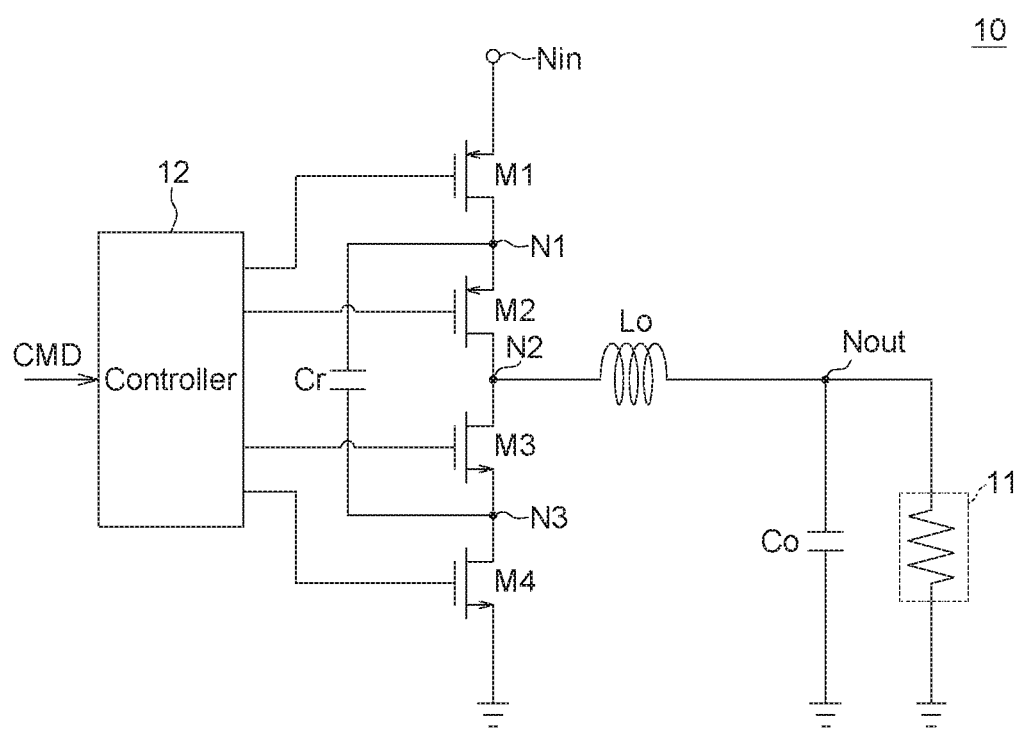
FIG. 1 is a circuit diagram illustrating a circuit configuration of a power conversion circuit according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a circuit diagram illustrating a circuit configuration of a power conversion circuit 10 according to an embodiment of the present disclosure. The illustrated power conversion circuit 10 may be referred to as, for example, a DC-to-DC converter or a resonant converter which converts an input voltage (Vin) into an output voltage (Vout) lower than the Vin and outputs the Vout to a load 11.

The power conversion circuit 10 includes an input terminal Nin, a first switching element M1, a second switching element M2, a third switching element M3, a fourth switching element M4, an inductor Lo, a capacitor Cr and a controller 12. The input terminal Nin receives the Vin. Each of the first to fourth switching elements M1-M4 may be any type of solid-state transistor, such as field effect transistor (FET).

The first switching element M1 has a pair of first terminals (e.g., drain/source) and a first control terminal (e.g., gate), wherein the pair of first terminals is connected between the input terminal Nin and a first node N1. The second switching element M2 has a pair of second terminals (e.g., drain/source) and a second control terminal (e.g., gate), wherein the pair of second terminals is connected between the first node N1 and a second node N2. The third switching element M3 has a pair of third terminals (e.g., drain/source) and a third control terminal (e.g., gate), wherein the pair of third terminals is connected between the second node N2 and a third node N3. The fourth switching element M4 has a pair of fourth terminals (e.g., drain/source) and a fourth control terminal (e.g., gate), wherein the pair of fourth terminals is connected between the third node N3 and a ground. The capacitor Cr is coupled between the first node N1 and the third node N3. The inductor Lo is coupled between the second node N2 and an output node Nout that is coupled to the load 11 and the output capacitor Co.

In the embodiment, the controller 12 is configured to control the first, second, third and fourth switching elements M1-M4 to be switched ON/OFF through the first, second, third and fourth control terminals, respectively. For example, the controller 12 may receive one or more commands CMD and control the operations of switching elements in the power conversion circuit 10 (e.g., the first to fourth switching elements M1-M4) by sending signals through the respective control terminals.

The controller 12 may regulate the voltage, Vout, at the output node Nout by repetitively (1) charging the inductor Lo with a first current before charging the capacitor Cr causing a second current to flow in the inductor Lo and (2) charging the inductor Lo with a third current before discharging the capacitor Cr causing a fourth current to flow in the inductor Lo.

For example, the controller 12 may control the first to fourth switching elements M1-M4 in a switching sequence including: transferring power to the load 11 through a first conduction path including the first switching element M1, the second switching element M2 and the inductor Lo, causing the first current to flow in the inductor Lo; and when the first current reaches a preset level, transferring power to the load 11 through a second conduction path including the first switching element M1, the capacitor Cr, the third switching element M3 and the inductor Lo, so that the capacitor Cr is charged and the second current flows in the inductor Lo.

The controller 12 may further control the first to fourth switching elements M1-M4 in a switching sequence including: entering a standby state by isolating the second node N2 from the input terminal Nin when a current in the inductor Lo is approximately zero; when a voltage across the pair of the second terminals of the second switching element M2 (e.g., the drain-to-source voltage (Vds) of the second switching element M2) is less than a voltage threshold during the standby state, transferring power to the load 11 through a third conduction path including the first switching element M1, the second switching element M2 and the inductor Lo, causing the third current to flow in the inductor Lo; and when the third current reaches another preset level, transferring power to the load 11 through a fourth conduction path including the fourth switching element M4, the capacitor Cr, the second switching element M2 and the inductor Lo, so that the capacitor Cr is discharged and the fourth current flows in the inductor Lo.

Figure 2:
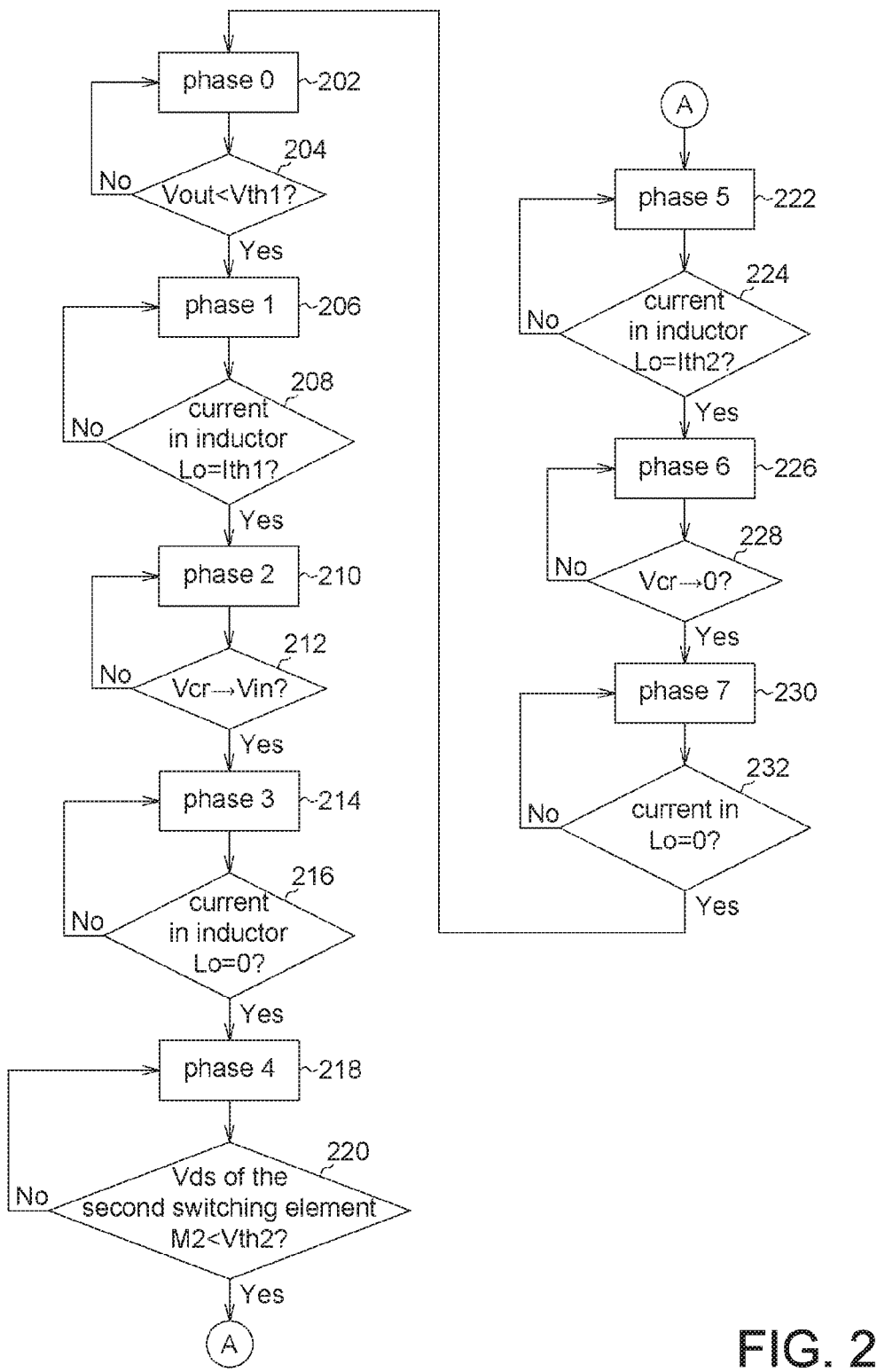
FIG. 2 illustrates an exemplary switching sequence of the power conversion circuit in accordance with an embodiment of the present disclosure.

FIG. 2 illustrates an exemplary switching sequence of the power conversion circuit 10 in accordance with an embodiment of the present disclosure. FIGS. 3A-3H are circuit configurations of the power conversion circuit 10 in different phases of the switching sequence. For the ease of illustration, in these figures the conduction path formed by the turn-on switching elements is depicted with dashed arrow.

Figure 3A:
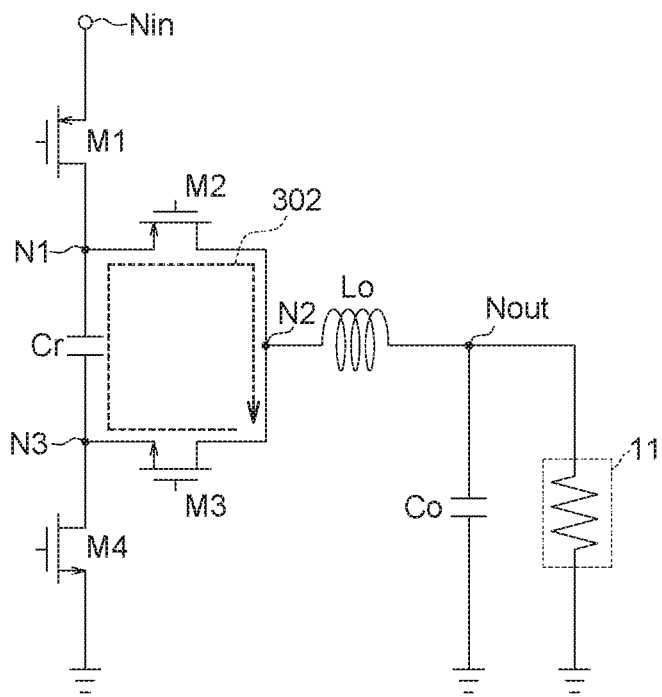
FIGS. 3A-3H are circuit configurations of the power conversion circuit in different phases of the switching sequence.

Please refer to FIGS. 2 and 3A. In step 202, the power conversion circuit 10 is operated in phase 0, in which the controller 12 forms the conduction path 302 by turning on the second and third switching elements M2, M3, and turning off the first and fourth switching elements M1, M4. In phase 0, the capacitor Cr is in a shorted condition, allowing residual charges within the capacitor Cr to reset.

In step 204, after the controller 12 sets the first to fourth switching elements M1-M4 to their respective states identified in phase 0, it detects whether the Vout of the power conversion circuit 10 is less than a voltage threshold (Vth1). If yes, the switching sequence advances to step 206. If not, the controller 12 continues to detect the Vout until it drops below the Vth1.

In an embodiment, the controller 12 may cyclically detect the Vout and then compare it to the Vth1. Alternatively or additionally, the controller 12 may respond to a signal, such as from a comparator, which indicates that the Vout decreases below the Vth1 and respond accordingly.

Figure 3B:
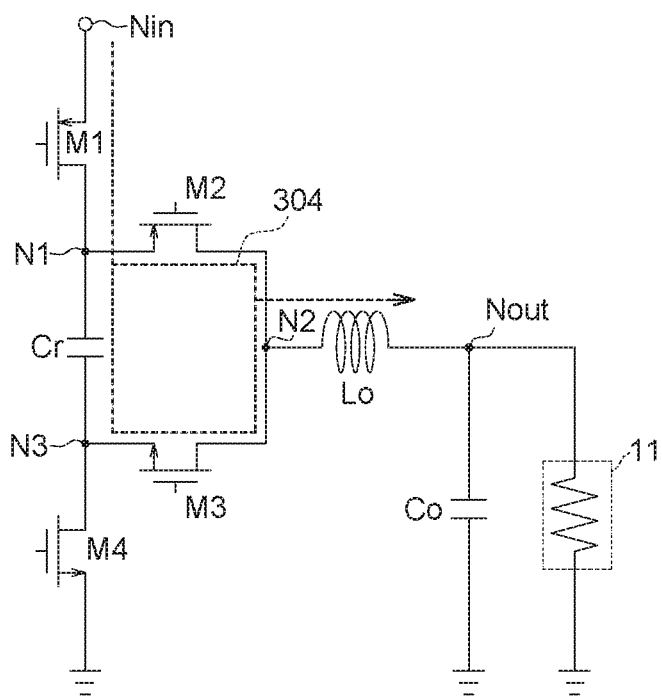

Now referring to FIGS. 2 and 3B, in step 206, the power conversion circuit 10 is switched to phase 1, in which the controller 12 forms the conduction path 304 by turning on the first, second and third switching elements M1, M2, M3 and turning off the fourth switching element M4. As shown in FIGS. 3A and 3B, when the power conversion circuit 10 is switched from phase 0 to phase 1, only the state of the first switching element M1 is switched from the OFF state to the ON state, while the states of other switching elements such as the second, third and fourth switching elements M2, M3, M4 remain unchanged.

In phase 1, the Vin is directly applied to the second node N2, resulting in an increasing current (which is referred to as the first current in this example) flowing in the inductor Lo. Meanwhile, the capacitor Cr still remains in the shorted condition.

Because in phase 1 power is transferred to the load 11 through the linearly increasing first current instead of a current dominated by the LC resonant tank comprised of the capacitor Cr and the inductor Lo, the level of the transmitted power to the load 11 is not limited to the ratio of L/C, where L represents the inductance of the inductor Lo, and C represents the capacitance of the capacitor Cr. Therefore, the power handling capability is improved, even in the case that the size of the inductor Lo and the capacitor Cr are reduced.

In step 208, after the controller 12 sets the first to fourth switching elements M1-M4 to their respective states identified in phase 1, it detects whether the first current reaches to a preset level (Ith1). If yes, the switching sequence advances to step 210. If not, the controller 12 continues to detect the first current until the value of the first current reaches to Ith1.

In an embodiment, the controller 12 may cyclically detect the first current and then compare it to the Ith1. Alternatively or additionally, the controller 12 may respond to a signal, such as from a comparator, which indicates that the first current reaches to the Ith1 and respond accordingly.

Next, please refer to FIGS. 2 and 3O. In step 210, the power conversion circuit 10 is switched to phase 2, in which the controller 12 forms the conduction path 306 by turning on the first and third switching elements M1, M3 and turning off the second and fourth switching elements M2, M4. As shown in FIGS. 3B and 3O, when the power conversion circuit 10 is switched from phase 1 to phase 2, only the state of the second switching element M2 is switched from the ON state to the OFF state, while the states of other switching elements such as the first, third and fourth switching elements M1. M3, M4 remain unchanged.

In phase 2, the input voltage Vin is applied directly to the first node N1 through the first switching element M1. Therefore, the capacitor Cr, which was fully discharged in the previous phases, now begins to charge, resulting in a current (which is referred to as the second current in this example) flowing in the inductor Lo. As an example, the capacitor Cr may charge with a time constant determined by the LC value of the resonant tank comprised of the capacitor Cr and the inductor Lo.

In step 212, the controller 12 detects whether the voltage (Vcr) across the capacitor Cr is approximately equal to the Vin. If yes, the switching sequence advances to step 214. If not, the controller 12 continues to detect the Vcr until it is approximately equal to the Vin.

Figure 3C:
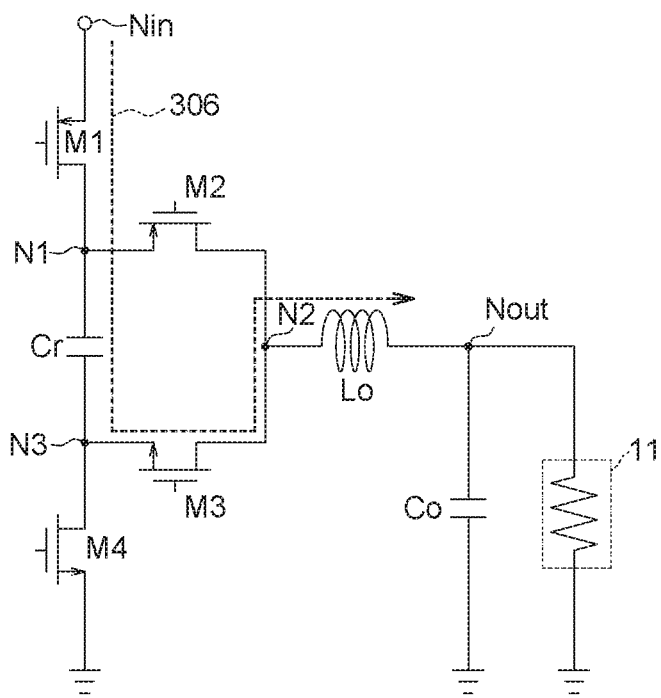
Figure 3D:
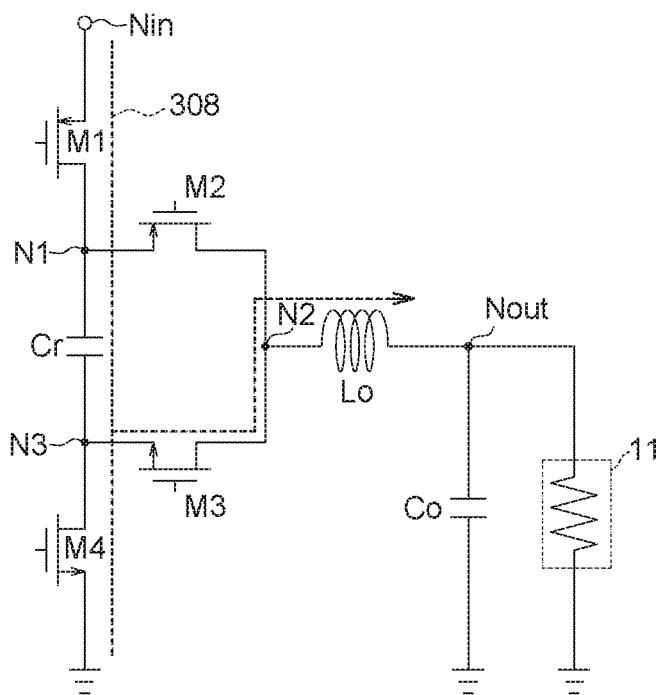

Now please refer to FIGS. 2 and 3D. In step 214, the power conversion circuit 10 is switched to phase 3, in which the controller 12 forms the conduction path 308 by turning on the first, third and fourth switching elements M1, M3, M4 and turning off the second switching element M2. As shown in FIGS. 3C and 3D, when the power conversion circuit 10 is switched from phase 2 to phase 3, only the state of the fourth switching element M4 is switched from the OFF state to the ON state, while the states of other switching elements such as the first, second and third switching elements M1, M2, M3 remain unchanged.

In phase 3, the inductor Lo is shorted to the ground, resulting in a rapid discharge of any remaining current within the inductor Lo.

After configuring the states of the first to fourth switching elements M1-M4, the switching scheme advances to step 216, in which the current in the inductor Lo is detected. If the controller 12 detects that the current in the inductor Lo is approximately equal to zero, the switching sequence advances to step 218; otherwise, the controller 12 continues to detect the current in the inductor Lo until it is approximately equal to zero.

Figure 3E:
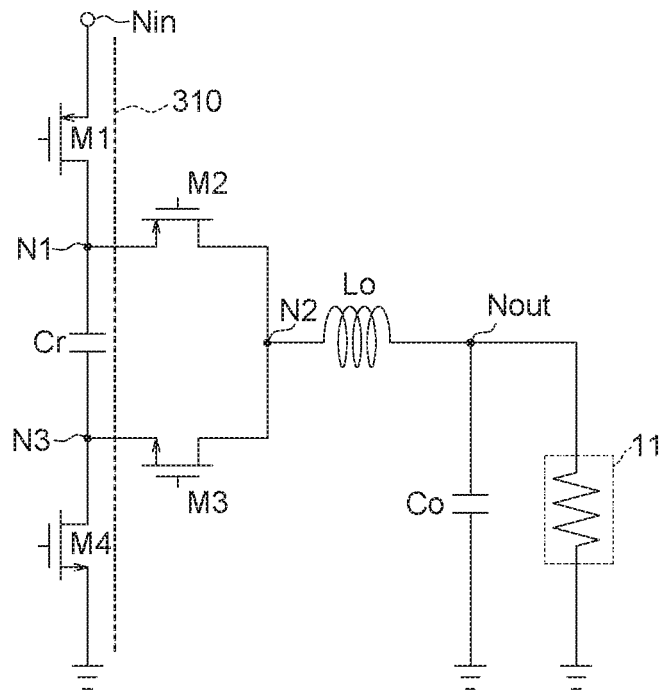

Referring to FIGS. 2 and 3E, in step 218, the power conversion circuit 10 is switched to phase 4, in which the controller 12 forms the conduction path 310 by turning on the first and fourth switching elements M1, M4 and turning off the second and third switching element M2, M3. As shown in FIGS. 3D and 3E, when the power conversion circuit 10 is switched from phase 3 to phase 4, only the state of the third switching element M3 is switched from the ON state to the OFF state, while the states of other switching elements such as the first, second and fourth switching elements M1, M2, M4 remain unchanged.

In phase 4, the power conversion circuit 10 equivalently enters the standby state that the second node N2 is isolated from the input terminal Nin. In such cases, the inductor Lo is decoupled from the remainder of the power conversion circuit 10, so that the power conversion circuit 10 stops transferring power to the load 11.

Then, in step 220, the controller 12 detects whether the Vds of the second switching element M2 is less than a voltage threshold (Vth2). If yes, the switching sequence advances to step 222. If not, the controller 12 continues to detect the Vds until it drops below the Vth2.

In an embodiment, the controller 12 may cyclically detect the Vds and then compare it to the Vth2. Alternatively or additionally, the controller 12 may respond to a signal, such as from a comparator, which indicates that the Vds decreases below the Vth2 and respond accordingly.

Figure 3F:
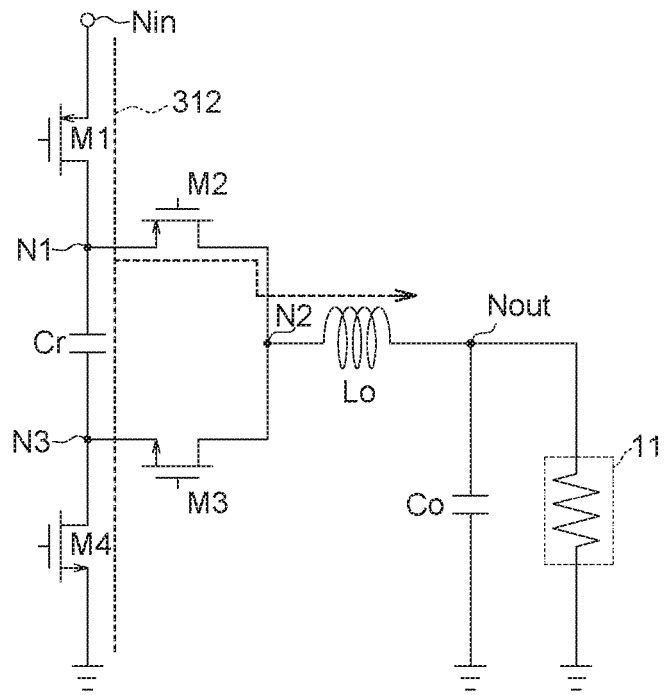

Now referring to FIGS. 2 and 3F, in step 222, the power conversion circuit 10 is switched to phase 5, in which the controller 12 forms the conduction path 312 by turning on the first, second and fourth switching elements M1, M2, M4 and turning off the third switching element M3. As shown in FIGS. 3E and 3F, when the power conversion circuit 10 is switched from phase 4 to phase 5, only the state of the second switching element M2 is switched from the OFF state to the ON state, while the states of other switching elements such as the first, third and fourth switching elements M1, M3, M4 remain unchanged.

The value of Vth2 can be properly chosen for valley switching of the second switching element M2, such that the second switching element M2 is turned on when the voltage across the pair of second terminals is relatively small (e.g., approximately equal to 0V). In this manner, the turn-on loss of the second switching element M2 is reduced.

Compared to phases 1-4 as described previously, phases 5-7 are another half cycle to transfer power to the load 11. As shown, in phase 5, the Vin is directly applied to the second node N2 through the first and second switching elements M1, M2, resulting in an increasing current (which is referred to as the third current in this example) flowing in the inductor Lo.

Because in phase 5 power is transferred to the load 11 through the linearly increasing third current instead of a current dominated by the LC resonant tank comprised of the capacitor Cr and the inductor Lo, the level of the transmitted power to the load 11 is not limited to the ratio of L/C. Therefore, the power handling capability is improved, even the case that the size of the inductor Lo and the capacitor Cr are reduced.

In step 224, after the controller 12 sets the first to fourth switching elements M1-M4 to their respective states identified in phase 5, it detects whether the third current reaches to a preset level (Ith2). If yes, the switching sequence advances to step 226. If not, the controller 12 continues to detect the third current until the value of the third current reaches to Ith2.

In some embodiments, the value of Ith2 can be independent of the value of Ith1, depending on the demand of various applications. That is, the two currents thresholds, Ith1 and Ith2, presented in steps 208 and 224, respectively, can be the same or different from each other.

In an embodiment, the controller 12 may cyclically detect the third current and then compare it to the Ith2. Alternatively or additionally, the controller 12 may respond to a signal, such as from a comparator, which indicates that the third current reaches to the Ith2 and respond accordingly.

Figure 3G:
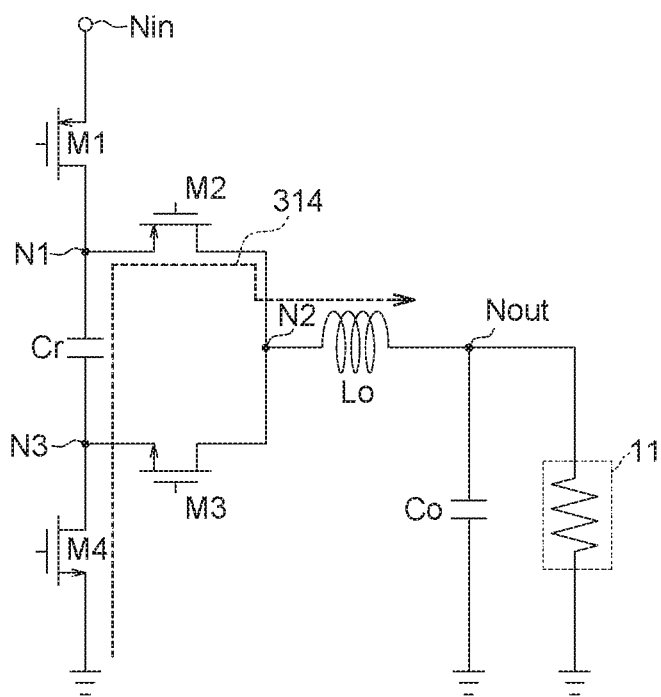

Next, please refer to FIGS. 2 and 3G. In step 226, the power conversion circuit 10 is switched to phase 6, in which the controller 12 forms the conduction path 314 by turning on the second and fourth switching elements M2, M4 and turning off the first and third switching elements M1, M3. As shown in FIGS. 3F and 3G, when the power conversion circuit 10 is switched from phase 5 to phase 6, only the state of the first switching element M1 is switched from the ON state to the OFF state, while the states of other switching elements such as the second, third and fourth switching elements M2, M3, M4 remain unchanged.

In phase 6, the capacitor Cr is connected between the inductor Lo and the ground, allowing the charge stored in the capacitor Cr to discharge through the inductor Lo the load 11. When the capacitor Cr begins to discharge, the third current, which has reached to the preset level of Ith2, in the inductor Lo starts to increase to the fourth current. In other words, because in phase 6 the capacitor Cr resonates with the inductor Lo, the capacitor Cr discharges causing the current to increase in the inductor Lo.

In step 228, the controller 12 detects whether the Vcr across the capacitor Cr is approximately equal to 0V. If yes, the switching sequence advances to step 230. If not, the controller 12 continues to detect the Vcr until it is approximately equal to 0V.

Figure 3H:
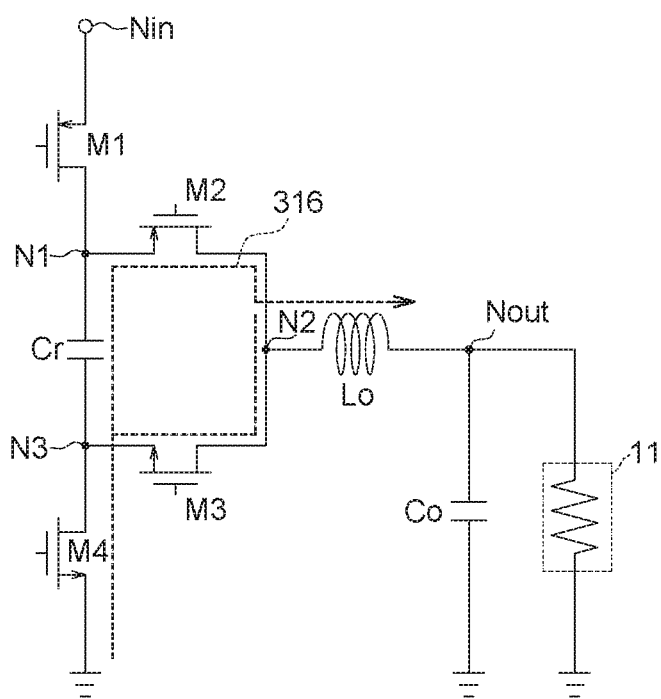

Now please refer to FIGS. 2 and 3H, In step 230, the power conversion circuit 10 is switched to phase 7, in which the controller 12 forms the conduction path 316 by turning on the second, third and fourth switching elements M2, M3, M4 and turning off the first switching element M1. As shown in FIGS. 3G and 3H, when the power conversion circuit 10 is switched from phase 6 to phase 7, only the state of the third switching element M3 is switched from the OFF state to the ON state, while the states of other switching elements such as the first, second and fourth switching elements M1, M2, M4 remain unchanged.

In phase 7, the inductor Lo is shorted to the ground, resulting in a rapid discharge of any remaining current within the inductor Lo.

Then, in step 232, the controller 12 detects whether the current in the inductor Lo is approximately equal to zero. If yes, the switching sequence goes back to step 202; otherwise, the controller 12 continues to detect the current in the inductor Lo until it is approximately equal to zero.

In the exemplary switching sequence shown in FIGS. 3A-3H, the voltage at the load 11 is regulated by repetitively (1) charging the inductor Lo with the first current having a preset level of Ith1 before charging the capacitor Cr causing the second current to flow in the inductor Lo; and (2) charging the inductor Lo with the third current having a preset level of Ith2 before discharging the capacitor Cr causing the fourth current to flow in the inductor Lo. In this manner, the level of the transmitted power to the load 11 is not limited to the characteristic of the resonant tank comprised of the inductor Lo and the capacitor Cr. Therefore, the power handling capability is improved, even in the case that the size of the inductor Lo and the capacitor Cr are reduced. Further, because the inductor Lo is pre-charged by the first and third currents in phases 1 and 5, respectively, the charge on the capacitor Cr can be balanced at both ends of a complete cycle (phases 0 and 7), thereby reducing extra losses during each cycle. Moreover, as the power conversion circuit 10 is switched form one phase to another phase, only one switching element's state needs to be changed; therefore, the switching loss can be minimized.

Figure 4:
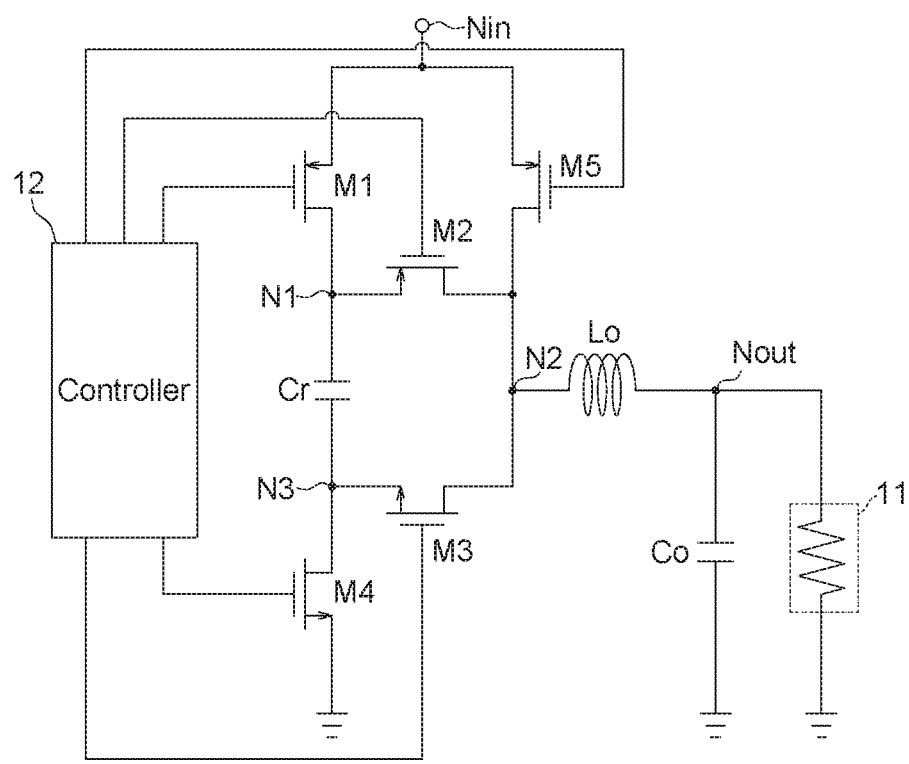
FIG. 4 is a circuit diagram illustrating a circuit configuration of a power conversion circuit according to an embodiment of the present disclosure.

FIG. 4 is a circuit diagram illustrating a circuit configuration of a power conversion circuit 40 according to an embodiment of the present disclosure. Compared to power conversion circuit 10 as described previously, the power conversion circuit 40 further includes a fifth switching element M5 having a pair of fifth terminals and a fifth control terminal, wherein the pair of fifth terminals is connected between the input terminal Nin and the second node N2, and the fifth switching element M5 is controlled to be switched ON/OFF by the controller 12 through the fifth control terminal.

Figure 5:
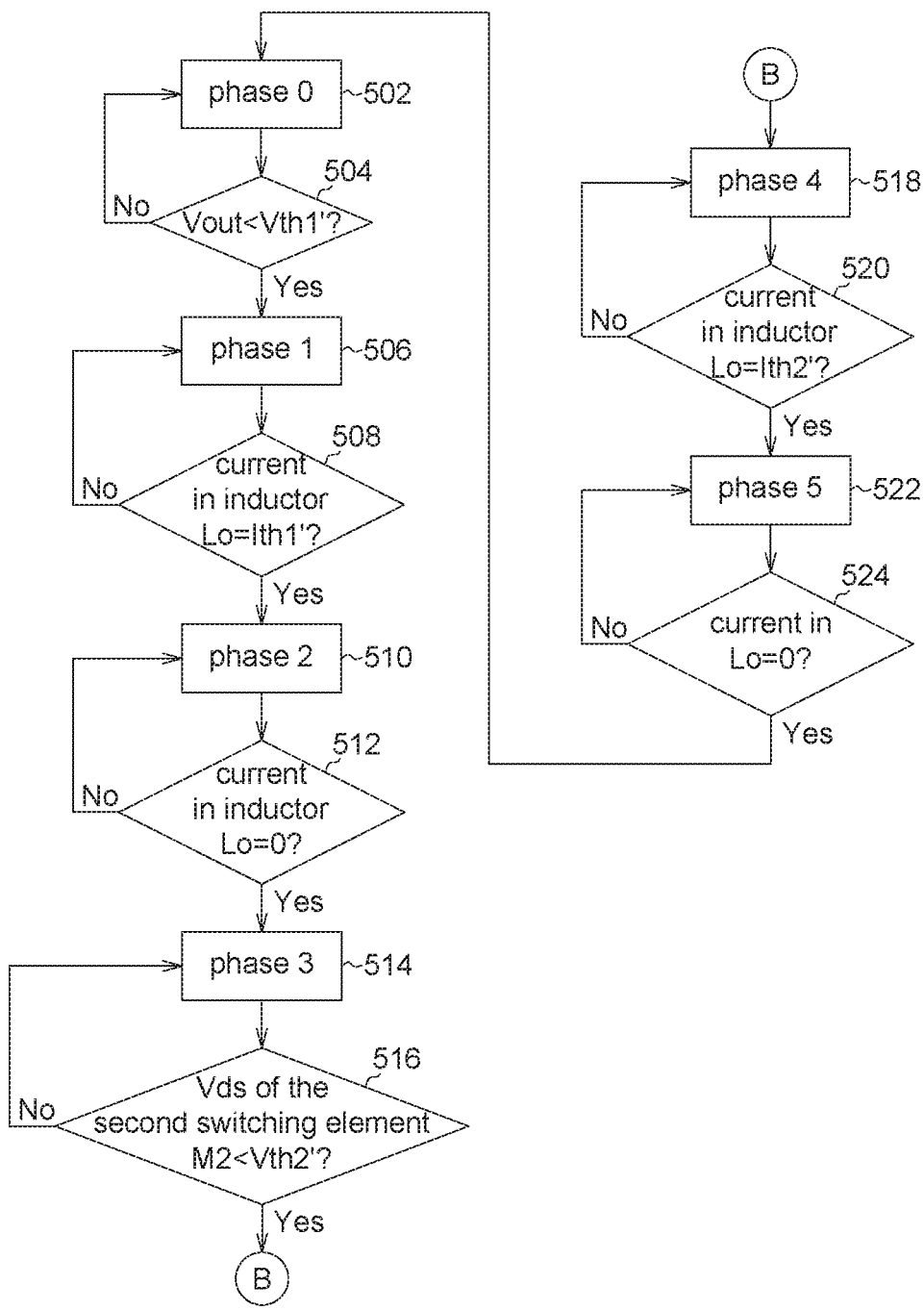
FIG. 5 illustrates an exemplary switching sequence of the power conversion circuit in accordance with an embodiment of the present disclosure.

FIG. 5 illustrates an exemplary switching sequence of the power conversion circuit 40 in accordance with an embodiment of the present disclosure. FIGS. 6A-6F are circuit configurations of the power conversion circuit 40 in different phases of the switching sequence. For the ease of illustration, in these figures the conduction path formed by the turn-on switching elements is depicted with dashed arrow.

Figure 6A:
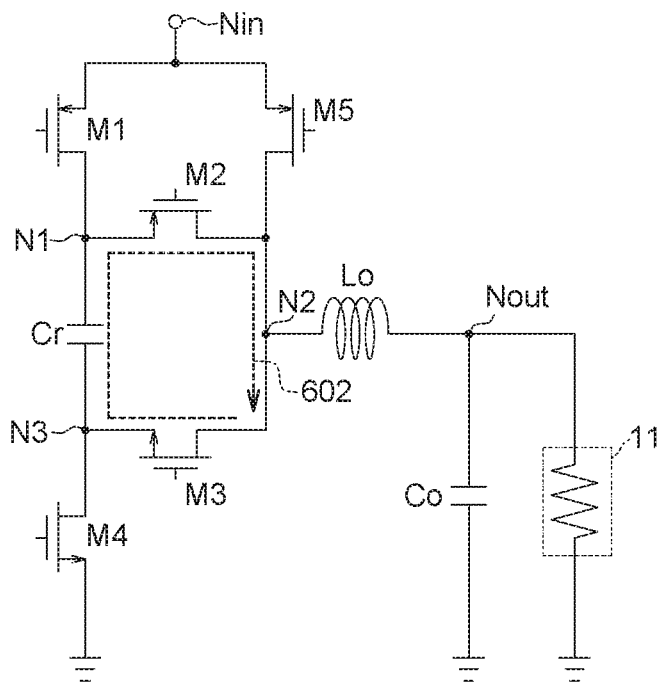
FIGS. 6A-6F are circuit configurations of the power conversion circuit in different phases of the switching sequence.

Please refer to FIGS. 5 and 6A. In step 502, the power conversion circuit 40 is operated in phase 0, in which the controller 12 forms the conduction path 602 by turning on the second and third switching elements M2, M3, and turning off the first, fourth and fifth switching elements M1, M4, M5. In phase 0, the capacitor Cr is in a shorted condition, allowing residual charges within the capacitor Cr to reset.

In step 504, after the controller 12 sets the first to fifth switching elements M1-M5 to their respective states identified in phase 0, it detects whether the voltage (Vout) at the output node Nout of the power conversion circuit 40 is less than a voltage threshold (Vth1'). If yes, the switching sequence advances to step 506. If not, the controller 12 continues to detect the Vout until it drops below the Vth1'.

Figure 6B:
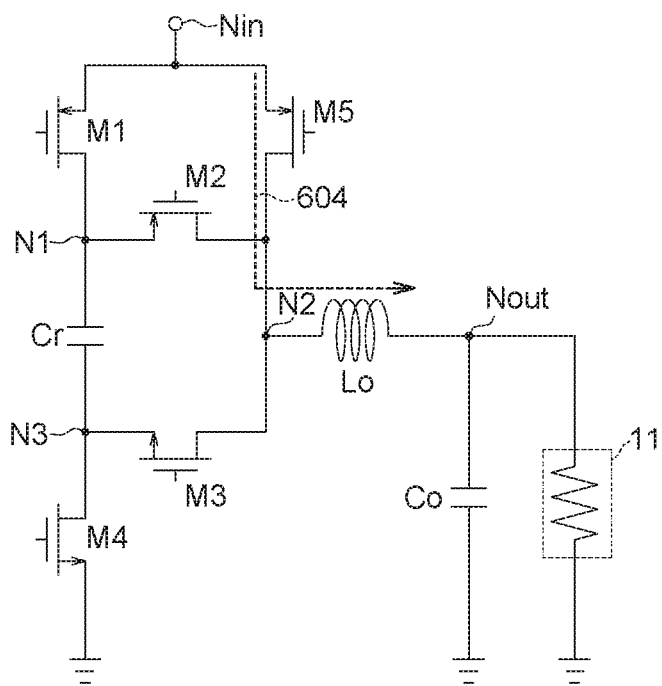

Now referring to FIGS. 5 and 6B, in step 506, the power conversion circuit 40 is switched to phase 1, in which the controller 12 forms the conduction path 604 by turning on the fifth switching element M5 and turning off the first to fourth switching elements M1-M4.

In phase 1, the input voltage (Vin) supplied on the input terminal Nin of the power conversion circuit 40 is directly applied to the second node N2 through the fifth element M5, resulting in an increasing current (which is referred to as the first current in this example) flowing in the inductor Lo. Because in phase 1 power is transferred to the load 11 through the linearly increasing first current instead of a current dominated by the LC resonant tank comprised of the capacitor Cr and the inductor Lo, the level of the transmitted power to the load 11 is not limited to the ratio of L/C. Therefore, the power handling capability is improved, even in the case that the size of the inductor Lo and the capacitor Cr are reduced.

In step 508, the controller 12 detects whether the first current in the inductor Lo reaches to a preset level (Ith1'). If yes, the switching sequence advances to step 510. If not, the controller 12 continues to detect the first current until the value of the first current reaches to Ith1'.

Figure 6C:
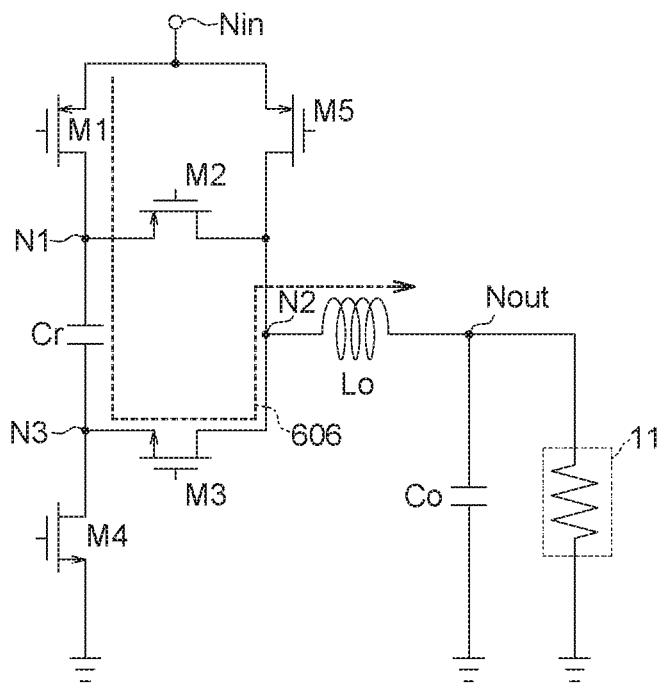

Next, please refer to FIGS. 5 and 6C. In step 510, the power conversion circuit 10 is switched to phase 2, in which the controller 12 forms the conduction path 606 by turning on the first and third switching elements M1, M3 and turning off the second, fourth and fifth switching elements M2, M4, M5.

In phase 2, the Vin is applied directly to the first node N1. Therefore, the capacitor Cr, which was fully discharged in the previous phases, now begins to charge, resulting in a current (which is referred to as the second current in this example) flowing in the inductor Lo.

Then, in step 512 the controller 12 detects whether the current in the inductor Lo is approximately equal to zero. If yes, the switching sequence advances to step 514; otherwise, the controller 12 continues to detect the current in the inductor Lo until it is approximately equal to zero.

Figure 6D:
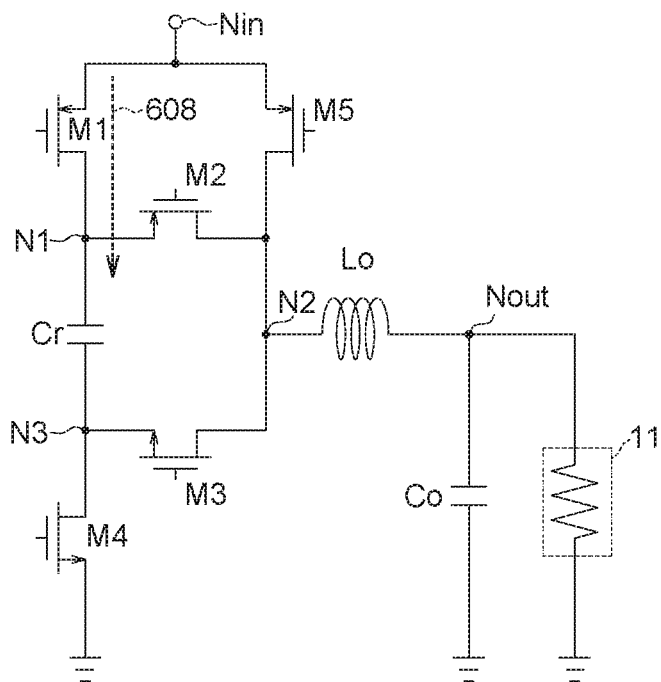

Referring to FIGS. 5 and 6D, in step 514, the power conversion circuit 40 is switched to phase 3, in which the controller 12 enters a standby state that the inductor Lo is decoupled from the remainder of the power conversion circuit 40, so that the power conversion circuit 40 stops transferring power to the load 11. In such cases, one end of the capacitor Cr is coupled to the input terminal Nin through the conduction path 608 including the turn-on first switching element M1.

In some embodiments, phase 3 of the power conversion circuit 40 may include one or more sub-phases such as phases 3 and 4 of the power conversion circuit 10 as described previously.

Then, in step 516, the controller 12 detects whether the voltage difference (Vds) between the pair of the second terminals of the second switching element M2 is less than a voltage threshold (Vth2'). If yes, the switching sequence advances to step 518. If not, the controller 12 continues to detect the Vds until it drops below the Vth2'.

Figure 6E:
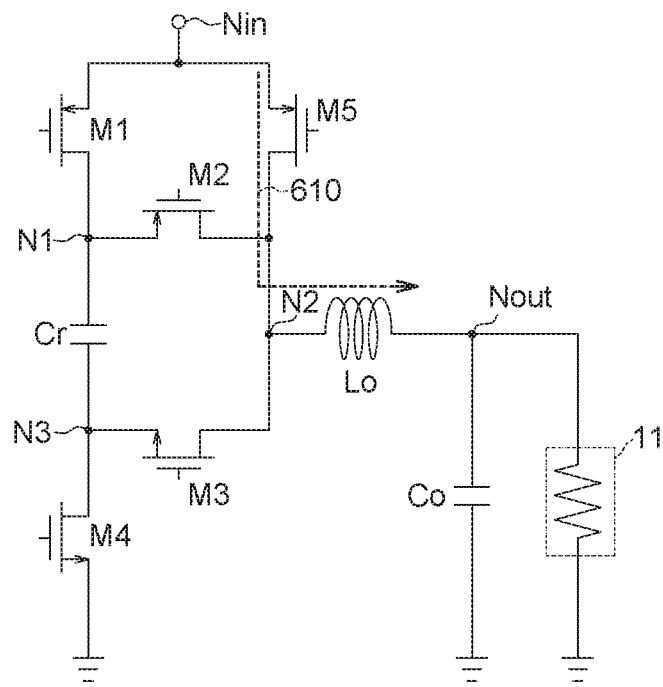

Now referring to FIGS. 5 and 6E, in step 518, the power conversion circuit 40 is switched to phase 4, in which the controller 12 forms the conduction path 610 by turning on the fifth switching element M5 and turning off the first to fourth switching elements M1-M4.

Similar to phase 1 as described above, in phase 4 the Vin is directly applied to the second node N2 through the fifth element M5, resulting in an increasing current (which is referred to as the third current in this example) flowing in the inductor Lo, instead of a current dominated by the LC resonant tank comprised of the capacitor Cr and the inductor Lo. Therefore, the power handling capability is improved, even in the case that the size of the inductor Lo and the capacitor Cr are reduced.

Then, in step 520, the controller 12 detects whether the third current in the inductor Lo reaches to a preset level (Ith2'). If yes, the switching sequence advances to step 522. If not, the controller 12 continues to detect the third current until the value of the third current reaches to Ith2'.

Figure 6F:
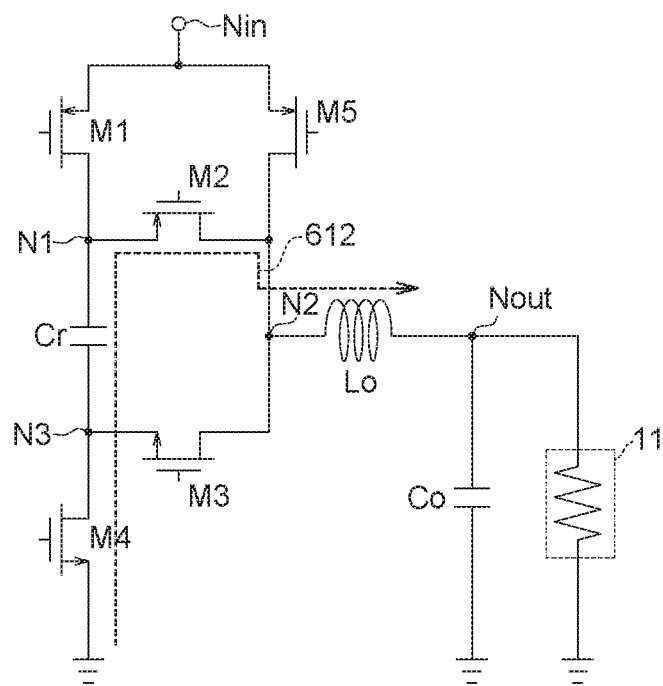

Please refer to FIGS. 5 and 6F. In step 522, the power conversion circuit 40 is switched to phase 5, in which the controller 12 forms the conduction path 612 by turning on the second and fourth switching elements M2, M4 and turning off the first, third and fifth switching elements M1, M3, M5.

In phase 5, the capacitor Cr is connected between the inductor Lo and the ground, allowing the charge stored in the capacitor Cr to discharge through the inductor Lo the load 11. When the capacitor Cr begins to discharge, the third current in the inductor Lo starts to increase to the fourth current. In other words, because in phase 5 the capacitor Cr resonates with the inductor Lo, the capacitor Cr discharges causing the current to increase in the inductor Lo.

Then, in step 524, the controller 12 detects whether the current in the inductor Lo is approximately equal to zero. If yes, the switching sequence goes back to step 502; otherwise, the controller 12 continues to detect the current in the inductor Lo until it is approximately equal to zero.

In some embodiments, the power conversion circuit (e.g., the power conversion circuit 10 or 40 as described above) can be operated in a dynamic voltage and frequency scaling (DVFS) mode and sink power from the load if the load has relatively high voltage than a predetermined voltage threshold.

Taking the power conversion circuit 10 as an example, the controller 12 is further configured to, in response to a command CMD for a DVFS operation, control the switching elements in a switching sequence including: sinking power from the load 12 through a first conduction path including the inductor Lo and the third and fourth switching elements M3, M4, so that the first current flows in the inductor Lo; and when the first current reaches a preset level, sinking power from the load 11 through a second conduction path including the inductor Lo, the second switching element M2, the capacitor Cr and the forth switching element M4, so that the second current flows in the inductor Lo.

Figure 7:
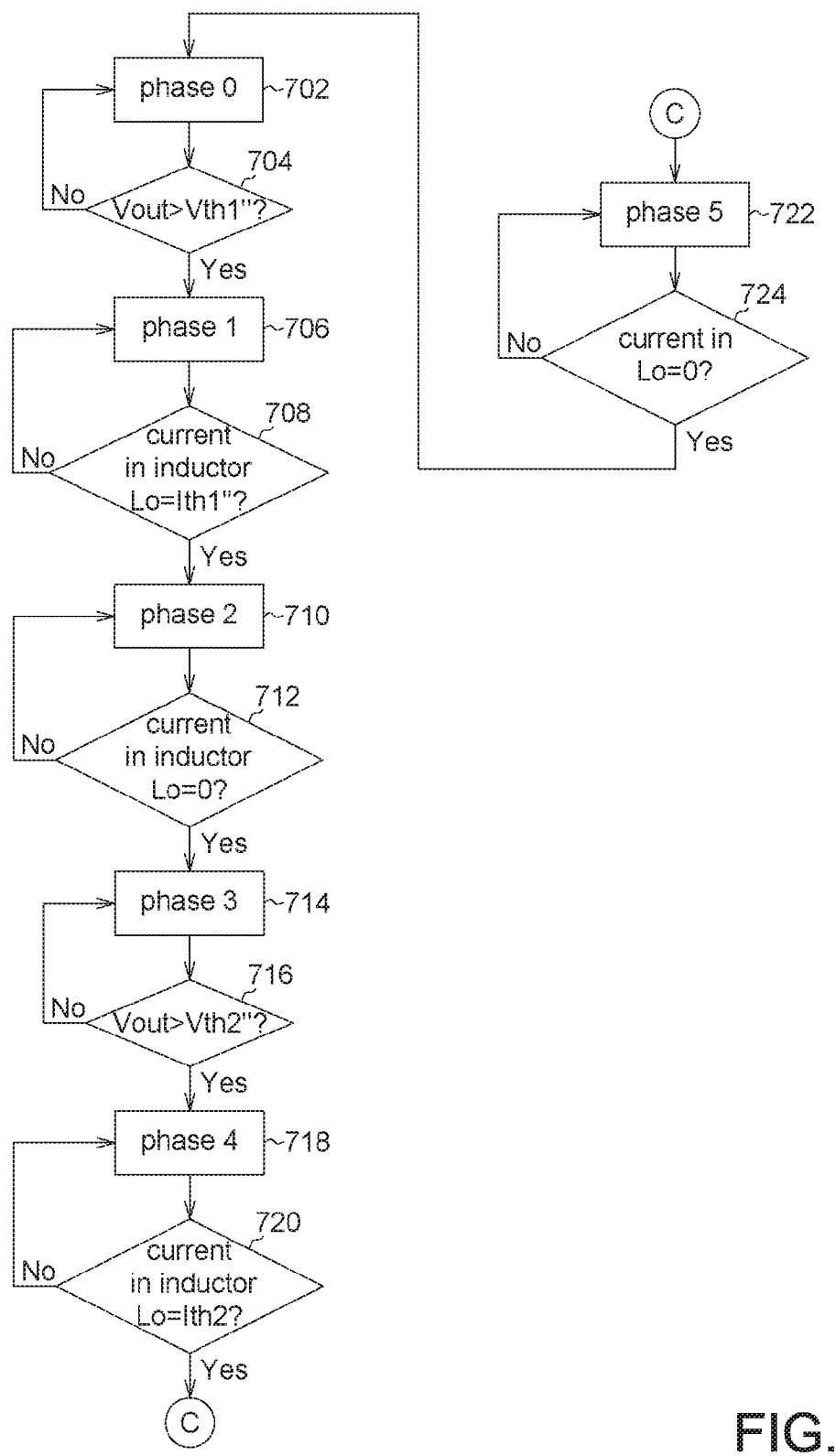
FIG. 7 illustrates an exemplary switching sequence that the power conversion circuit operates in the DVFS mode and sinks power from the load in accordance with an embodiment of the present disclosure.

FIG. 7 illustrates an exemplary switching sequence that the power conversion circuit 10 operates in the DVFS mode and sinks power from the load 11 in accordance with an embodiment of the present disclosure. FIGS. 8A-8F are circuit configurations of the power conversion circuit 10 in different phases of the switching sequence corresponding to the DVFS mode. For the ease of illustration, in these figures the conduction path formed by the turn-on switching elements is depicted with dashed arrow.

Figure 8A:
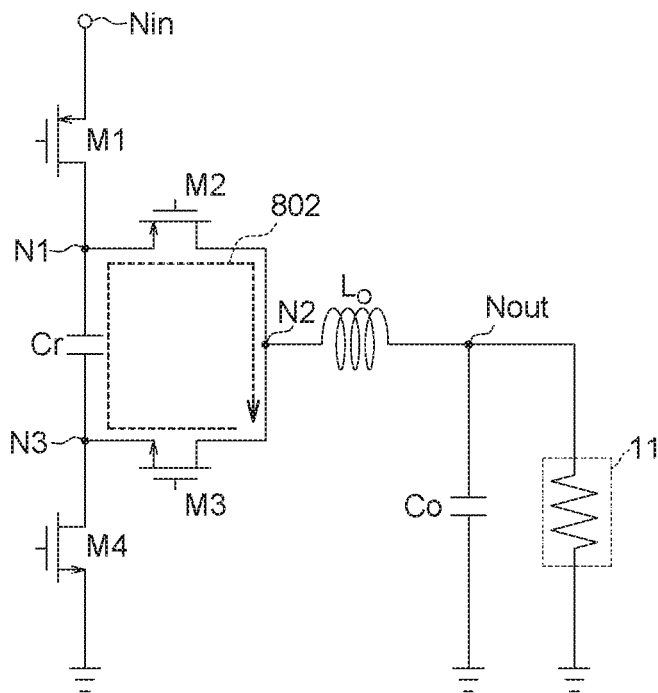
FIGS. 8A-8F are circuit configurations of the power conversion circuit in different phases of the switching sequence corresponding to the DVFS mode.

Please refer to FIGS. 7 and 8A. In step 702, the power conversion circuit 10 is operated in phase 0, in which the controller 12 forms the conduction path 802 by turning on the second and third switching elements M2, M3, and turning off the first and fourth switching elements M1, M4. In phase 0, the capacitor Cr is in a shorted condition, allowing residual charges within the capacitor Cr to reset.

In step 704, after the controller 12 sets the first to fourth switching elements M1-M5 to their respective states identified in phase 0, it detects whether the voltage (Vout) at the output node Nout of the power conversion circuit 10 is larger than a voltage threshold (Vth1"). If yes, the switching sequence advances to step 706. If not, the controller 12 continues to detect the Vout until it becomes higher than the Vth1".

Figure 8B:
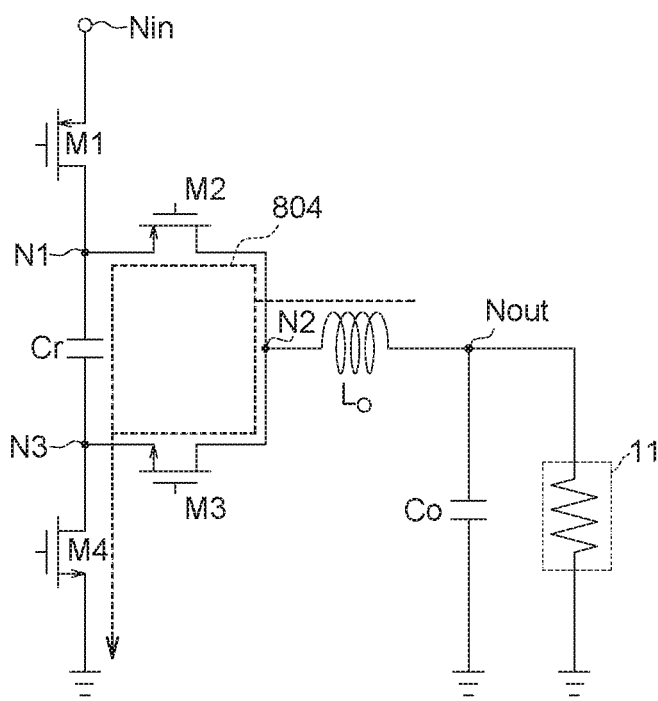
Figure 8C:
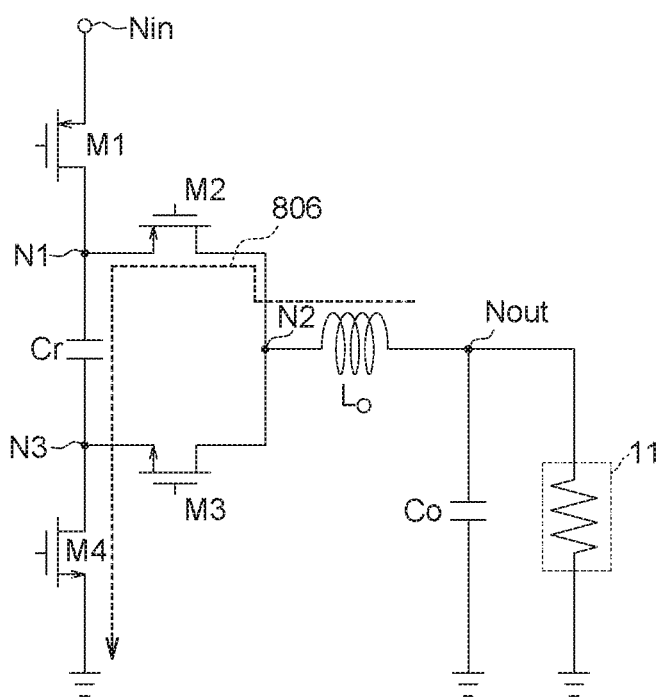

Now referring to FIGS. 7 and 8B, in step 706, the power conversion circuit 10 is switched to phase 1, in which the controller 12 forms the conduction path 804 by turning on the second, third and fourth switching element M2, M3, M4 and turning off the first switching element M1.

In phase 1, the voltage (Vout) at the output node Nout of the power conversion circuit 10 is relatively high, resulting in an increasing current (which is referred to as the first current in this example) flowing from the output node Nout to the ground through the inductor Lo. In such cases, power is transferred from the load 11 to the power conversion circuit 10, i.e., the power conversion circuit 10 sinks power from the load 11.

In step 708, the controller 12 detects whether the first current in the inductor Lo reaches to a preset level (Ith1"). If yes, the switching sequence advances to step 710. If not, the controller 12 continues to detect the first current until the value of the first current reaches to Ith1".

Next, please refer to FIGS. 7 and 7C. In step 710, the power conversion circuit 10 is switched to phase 2, in which the controller 12 forms the conduction path 806 by turning on the second and fourth switching elements M2, M4 and turning off the first and third switching elements M1, M3.

In phase 2, the capacitor Cr resonates with the inductor Lo, resulting in a current (which is referred to as the second current in this example) flowing in the inductor Lo.

Then, in step 712 the controller 12 detects whether the current in the inductor Lo is approximately equal to zero. If yes, the switching sequence advances to step 714; otherwise, the controller 12 continues to detect the current in the inductor Lo until it is approximately equal to zero.

Figure 8D:
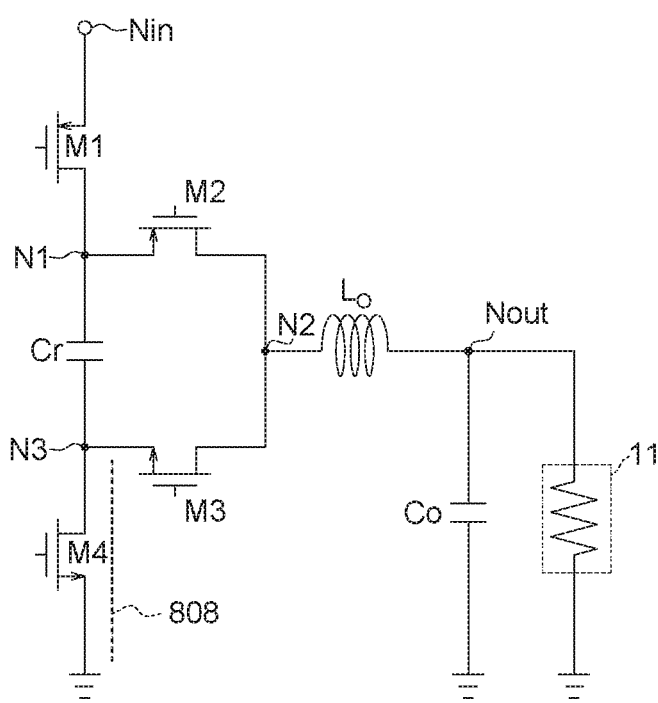

Referring to FIGS. 7 and 8D, in step 714, the power conversion circuit 10 is switched to phase 3, in which the controller 12 enters a standby state that the inductor Lo is decoupled from the remainder of the power conversion circuit 10, so that the load 11 stops transferring power to the power conversion circuit 10. In such cases, one end of the capacitor Cr is shorted to the ground through the conduction path 808 including the turn-on fourth switching element M4.

Then, in step 716, the controller 12 detects whether the Vout is larger than a voltage threshold (Vth2"). If yes, the switching sequence advances to step 718. If not, the controller 12 continues to detect the Vout until it becomes higher than the Vth2".

In some embodiments, the value of Vth2" can be independent of the value of Vth1" as described in step 704, depending on the demand of various applications. That is, the two voltage thresholds. Vth1" and Vth2", presented in steps 708 and 716, respectively, can be the same or different from each other.

Figure 8E:
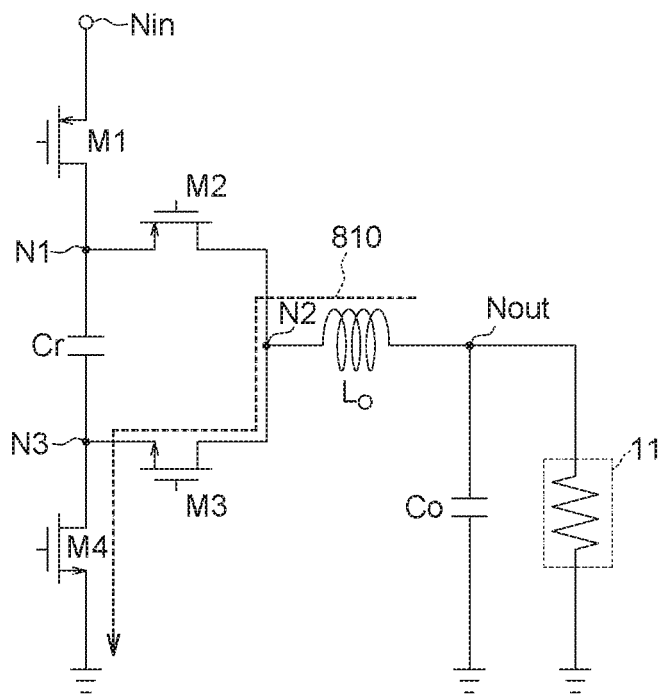

Now referring to FIGS. 7 and 8E, in step 718, the power conversion circuit 10 is switched to phase 4, in which the controller 12 forms the conduction path 810 by turning on the third and fourth switching element M3, M4 and turning off the first and second switching elements M1, M2.

Similar to phase 1 as described above, in phase 4 the Vout is relatively high, resulting in an increasing current (which is referred to as the third current in this example) flowing from the output node Nout to the ground through the inductor Lo. In such cases, power is transferred from the load 11 to the power conversion circuit 10 again.

Then, in step 720, the controller 12 detects whether the third current in the inductor Lo reaches to a preset level (Ith2"). If yes, the switching sequence advances to step 722. If not, the controller 12 continues to detect the third current until the value of the third current reaches to Ith2".

Figure 8F:
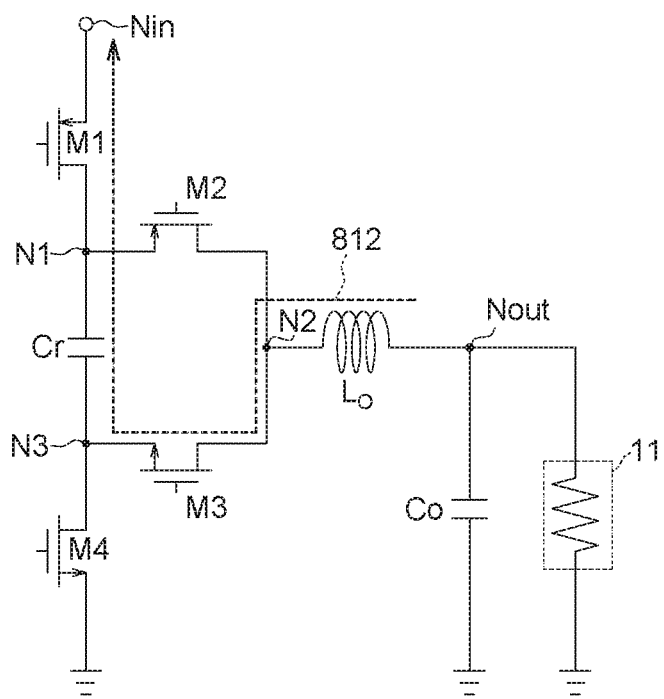

Please refer to FIGS. 7 and 8F. In step 722, the power conversion circuit 10 is switched to phase 5, in which the controller 12 forms the conduction path 812 by turning on the first and third switching elements M1, M3 and turning off the second and fourth switching elements M2, M4.

In phase 5, the capacitor Cr is connected between the inductor Lo and the input terminal, allowing input terminal Nin to sink power from the load 11. In such cases, the third current in the inductor Lo changes to a current (which is referred to as the fourth current in this example) flowing through the resonant tank of the series-connected inductor Lo and the capacitor Cr.

Then, in step 724, the controller 12 detects whether the current in the inductor Lo is approximately equal to zero. If yes, the switching sequence goes back to step 702; otherwise, the controller 12 continues to detect the current in the inductor Lo until it is approximately equal to zero.

In some embodiments, the power conversion circuit (e.g., the power conversion circuit 10 or 40 as described above) can work as a buck converter (step-down converter) that steps down voltage from the input terminal to its output node.

Taking the power conversion circuit 10 as an example, the controller 12 is further configured to, in response to a command CMD for a light load operation, control the switching elements in a switching sequence including: transferring power to the load 11 through the first and second switching elements M1, M2 and the inductor Lo during a first period of time; and transferring power to the load 11 through the third and fourth switching elements M3, M4 and the inductor Lo during a second period of time that is different and not overlapped with the first period of time.

Figure 9A:
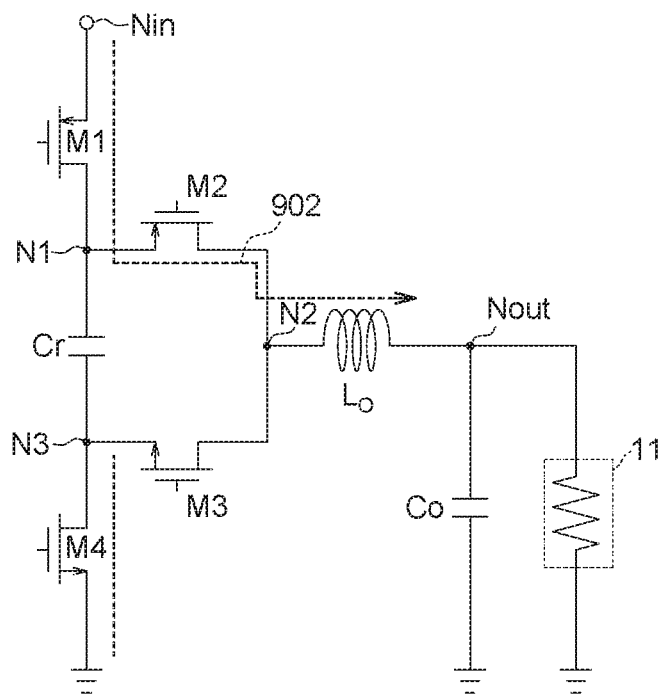
FIGS. 9A and 9B illustrates two phases of the light load operation of the power conversion circuit.
Figure 9B:
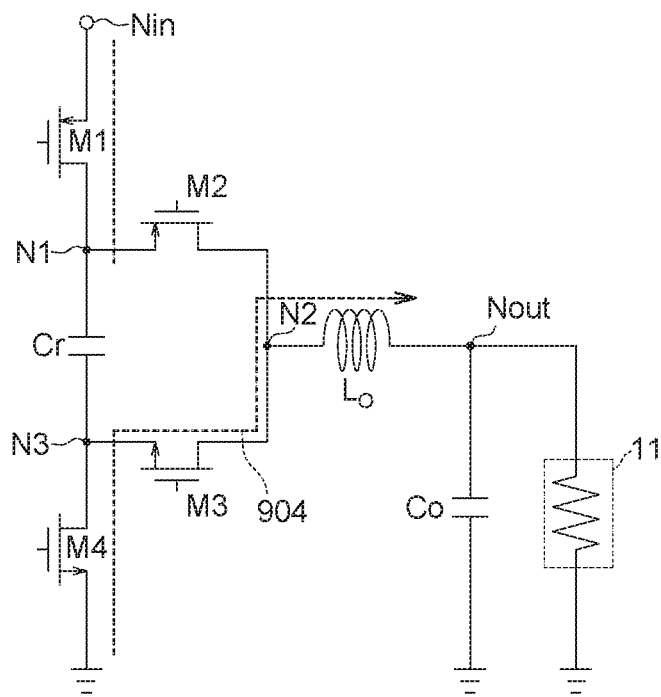

FIGS. 9A and 9B illustrates two phases of the light load operation of the power conversion circuit 10. As shown in 9A, the power conversion circuit 10 is operated in phase 0 in the first period of time, in which the controller 12 forms a conduction path 902 by turning on the first, second and fourth switching elements M1, M2, M4 and turning off the third switching element M3.

In this phase, the current flowing through the conduction path 902 begins to increase, and the inductor Lo produces an opposing voltage across the inductor Lo in response to the changing current. This voltage reduces the net voltage across the load 11. As the rate of change of the current decreases, the voltage across the inductor Lo also decreases, increasing the voltage (Vout) at the output node Nout. During this time, the inductor Lo stores energy in the form of a magnetic field. There will always be a voltage drop across the inductor Lo, so the net voltage at the load 11 will always be less than the input voltage source.

Now referring to FIG. 9B, the power conversion circuit 10 is switched to phase 1 in the second period of time, in which the controller 12 forms a conduction path 904 by turning on the first, third and fourth switching elements M1, M8, M4 and turning off the second switching element M2.

In phase 1, the Vin is decoupled from the load 11, and the current flowing through the load 11 will decrease. The changing current will produce a change in voltage across the inductor Lo, so that the inductor Lo becomes a voltage source. The stored energy in the inductor Lo supports current flow through the load 11. During this time, the inductor Lo is discharging its stored energy into the rest of the circuit.

With the above switching mechanism, the power conversion circuit 10 periodically sends energy from input terminal Nin to the load 11 and stores the energy in the inductor Lo in a fraction of a period (the first period of time), and uses the stored energy in the remaining fraction (the second period of time), resulting in a regulated voltage at the output node Nout of the power conversion circuit 10.

Figure 10:
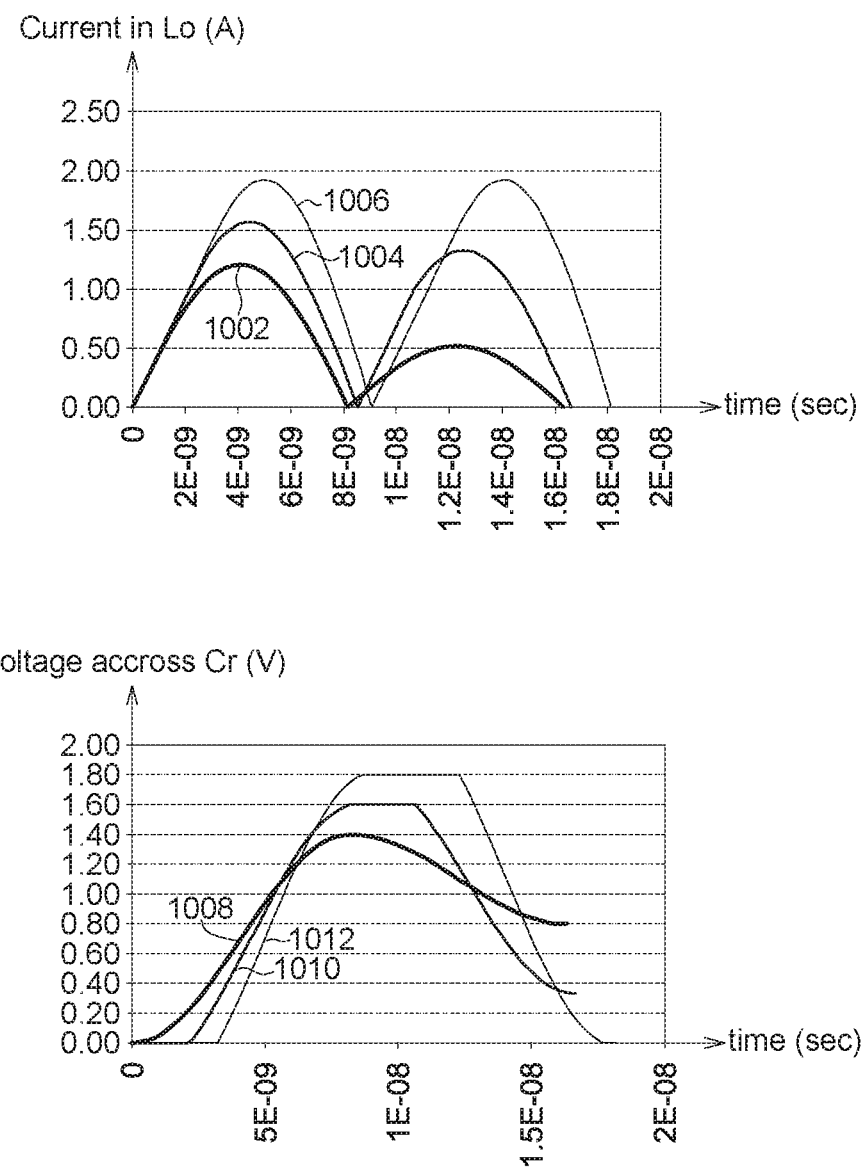
FIG. 10 illustrates a timing diagram of voltages and currents of the capacitor and inductor with different preset level conditions.

FIG. 10 illustrates a timing diagram of voltages and currents of the capacitor Cr and inductor Lo of the power conversion circuit 10 with different preset level conditions (e.g., preset levels Ith1 and Ith2 chosen in steps 208 and 224 in FIG. 2) when Vin is less than 2*Vout. In FIG. 10, curve 1002 represents the current of the inductor Lo in a cycle when the preset level Ith1/Ith2 of the first/third current is set as 0 A; curve 1004 represents the current of the inductor Lo in a cycle when the preset level Ith1/Ith2 of the first/third current is set as 1 A; and curve 1006 represents the current of the inductor Lo in a cycle when the preset level Ith1/Ith2 of the first/third current is set as 1.5 A. Curve 1008 represents the corresponding voltage of the capacitor Cr in a cycle when the preset level Ith1/Ith2 of the first/third current is set as 0 A; curve 1010 represents the corresponding voltage of the capacitor Cr in a cycle when the preset level Ith1/Ith2 of the first/third current is set as 1 A; and curve 1012 represents the corresponding voltage of the capacitor Cr in a cycle when the preset level Ith1/Ith2 of the first/third current is set as 1.5 A. In some embodiments, the preset level of Ith1 is not necessary equal to Ith2. Here, a cycle of the waveform refers to a loop from phase 0 to phase 7 shown in FIG. 3A-3H, for example, or a loop from phase 0 to phase 5 shown in FIG. 6A-6F.

As seen, by (1) charging the inductor Lo with the first current with a preset level of Ith1=1 A/1.5 A before charging the capacitor Cr and (2) charging the inductor Lo with the third current with a preset level of Ith2=1 A/1.5 A before discharging the capacitor Cr, the charge on the capacitor Cr can be balanced at both ends of a voltage regulation cycle, thereby reducing the extra losses during each cycle of the voltage regulation.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A power conversion circuit, comprising:
   an input terminal coupled to an input voltage;
   a first switching element having a pair of first terminals and a first control terminal, wherein the pair of first terminals is connected between the input terminal and a first node;
   a second switching element having a pair of second terminals and a second control terminal, wherein the pair of second terminals is connected between the first node and a second node;
   a third switching element having a pair of third terminals and a third control terminal, wherein the pair of third terminals is connected between the second node and a third node;
   a fourth switching element having a pair of fourth terminals and a fourth control terminal, wherein the pair of fourth terminals is connected between the third node and a ground;
   a capacitor coupled between the first node and the third node;
   an inductor coupled between the second node and a load; and
   a controller configured to control the first, second, third and fourth switching elements to be switched ON/OFF through the first, second, third and fourth control terminals, respectively, such that a voltage at the load is regulated by repetitively (1) directly charging the inductor with a first current and then charging the capacitor in series with the inductor so that a second current flowing in the inductor when the capacitor is charged and (2) directly charging the inductor with a third current and then discharging the capacitor in series with the inductor so that a fourth current flowing in the inductor when the capacitor is discharged.

2. The power conversion circuit according to claim 1, wherein the controller is configured to control the first, the second, the third and the fourth switching elements in a switching sequence comprising:
   transferring power to the load through a first conduction path comprising the first switching element, the second switching element and the inductor, so that the first current flows in the inductor; and
   when the first current reaches a preset level, transferring power to the load through a second conduction path comprising the first switching element, the capacitor, the third switching element and the inductor, so that the capacitor is charged and the second current flows in the inductor.

3. The power conversion circuit according to claim 2, wherein the controller is further configured to:
   form the first conduction path by turning on the first, second and third switching elements and turning off the fourth switching element; and
   form the second conduction path by turning on the first and third switching elements and turning off the second and fourth switching elements.

4. The power conversion circuit according to claim 2, wherein the switching sequence further comprises:
   entering a standby state by isolating the second node from the input terminal when a current in the inductor is approximately zero;
   when a voltage across the pair of the second terminals of the second switching element is less than a voltage threshold during the standby state, transferring power to the load through a third conduction path comprising the first switching element, the second switching element and the inductor, so that the third current flows in the inductor; and
   when the third current reaches another preset level, transferring power to the load through a fourth conduction path comprising the fourth switching element, the capacitor, the second switching element and the inductor, so that the capacitor is discharged and the fourth current flows in the inductor.

5. The power conversion circuit according to claim 4, wherein the controller is further configured to:
   form the third conduction path by turning on first, second and fourth switching elements and turning off the third switching element; and
   form the fourth conduction path by turning on the second and fourth switching elements and turning off the first and third switching elements.

6. The power conversion circuit according to claim 1, further comprising:
   a fifth switching element having a pair of fifth terminals and a fifth control terminal, wherein the pair of fifth terminals is connected between the input terminal and the second node, and the fifth switching element is controlled to be switched ON/OFF by the controller through the fifth control terminal.

7. The power conversion circuit according to claim 6, wherein the controller is configured to control the first, second, third, fourth and fifth switching elements in a switching sequence comprising:
  transferring power to the load through a first conduction path comprising the fifth switching element and the inductor, so that the first current flows in the inductor; and
  when the first current reaches a preset level, transferring power to the load through a second conduction path comprising the first switching element, the capacitor, the third switching element and the inductor, so that the capacitor is charged and the second current flows in the inductor.

8. The power conversion circuit according to claim 7, wherein the controller is further configured to:
  form the first conduction path by turning on the fifth switching element; and
  form the second conduction path by turning on the first and third switching elements and turning off the second, fourth and fifth switching elements.

9. The power conversion circuit according to claim 6, wherein the switching sequence further comprises:
  entering a standby state by isolating the second node from the input terminal when a current in the inductor is approximately zero;
  when a voltage across the pair of the second terminals of the second switching element is less than a voltage threshold during the standby state, transferring power to the load through a third conduction path comprising the fifth switching element and the inductor, so that the third current flows in the inductor; and
  when the third current reaches another preset level, transferring power to the load through a fourth conduction path comprising the fourth switching element, the capacitor, the second switching element and the inductor, so that the capacitor is discharged and the fourth current flows in the inductor.

10. The power conversion circuit according to claim 9, wherein the controller is further configured to:
  form the third conduction path by turning on fifth switching element and turning off the first to fourth switching elements; and
  form the fourth conduction path by turning on the second and fourth switching elements and turning off the first, third and fifth switching elements.

11. The power conversion circuit according to claim 1, wherein the controller is further configured to, in response to a command for a DVFS operation, control the first, the second, the third and the fourth switching elements in a switching sequence comprising:
  sinking power from the load through a first conduction path comprising the inductor and the third and fourth switching elements, so that the first current flows in the inductor; and
  when the first current reaches a preset level, sinking power from the load through a second conduction path comprising the inductor, the second switching element, the capacitor and the forth switching element, so that the second current flows in the inductor.

12. The power conversion circuit according to claim 11, wherein the controller is further configured to:
  form the first conduction path by turning on the second to fourth switching elements and turning off the first switching element; and
  form the second conduction path by turning on the second and fourth switching elements and turning off the first and third switching elements.

13. The power conversion circuit according to claim 11, wherein the switching sequence further comprises:
  entering a standby state by isolating the second node from the input terminal when a current in the inductor is approximately zero;
  when the voltage at the load is greater than a voltage threshold during the standby state, sinking power from the load through a third conduction path comprising the inductor and the third and fourth switching elements, so that the third current flows in the inductor; and
  when the third current reaches another preset level, sinking power from the load through a fourth conduction path comprising the inductor, the third switching element, the capacitor and the first switching element, so that the fourth current flows in the inductor.

14. The power conversion circuit according to claim 13, wherein the controller is further configured to:
  form the third conduction path by turning on the third and fourth switching elements and turning off the first and second switching elements; and
  form the fourth conduction path by turning on the first and third switching elements and turning off the second and fourth switching elements.

15. The power conversion circuit according to claim 1, wherein the controller is further configured to, in response to a command for a light load operation, control the first, the second, the third and the fourth switching elements in a switching sequence comprising:
  transferring power to the load through the first and second switching elements and the inductor during a first period of time; and
  transferring power to the load through the third and fourth switching elements and the inductor during a second period of time which is different and not overlapped with the first period of time.

16. The power conversion circuit according to claim 15, wherein the controller is further configured to:
  turn on the first, second and fourth switching elements and turn off the third switching element in the first period of time; and
  turn on the first, third and fourth switching elements and turn off the second switching element in the second period of time.

17. A method of operating a power conversion circuit, comprising:
  supplying an input voltage to the power conversion circuit, the power conversion circuit comprising: an input terminal coupled to an input voltage; a first switching element having a pair of first terminals and a first control terminal, wherein the pair of first terminals is connected between the input terminal and a first node; a second switching element having a pair of second terminals and a second control terminal, wherein the pair of second terminals is connected between the first node and a second node; a third switching element having a pair of third terminals and a third control terminal, wherein the pair of third terminals is connected between the second node and a third node; a fourth switching element having a pair of fourth terminals and a fourth control terminal, wherein the pair of fourth terminals is connected between the third node and a ground; a capacitor coupled between the first node and the third node; an inductor coupled between the second node and a load; and a controller configured to control the first, second, third and fourth switching elements to be switched ON/OFF through the first, second, third and fourth control terminals, respectively; and changing the ON/OFF configuration of the first to fourth switching elements by the controller, such that a voltage at the load is regulated by repetitively (1) directly charging the inductor with a first current and then charging the capacitor in series with the inductor so that a second current flowing in the inductor when the capacitor is charged and (2) directly charging the inductor with a third current and then discharging the capacitor in series with the indicator so that a fourth current flowing in the inductor when the capacitor is discharged.

18. The method according to claim 17, further comprising:

transferring power to the load through a first conduction path comprising the first switching element, the second switching element and the inductor, so that the first current flows in the inductor; and when the first current reaches a preset level, transferring power to the load through a second conduction path comprising the first switching element, the capacitor, the third switching element and the inductor, so that the capacitor is charged and the second current flows in the inductor.

19. The method according to claim 8, further comprising:
forming the first conduction path by turning on the first, second and third switching elements and turning off the fourth switching element; and
forming the second conduction path by turning on the first and third switching elements and turning off the second and fourth switching elements.

20. The method according to claim 18, further comprising:

entering a standby state by isolating the second node from the input terminal when a current in the inductor is approximately zero;

determining whether a voltage across the pair of the second terminals of the second switching element is less than a voltage threshold during the standby state;

when the voltage across the pair of the second terminals of the second switching element is less than the voltage threshold, transferring power to the load through a third conduction path comprising the first switching element, the second switching element and the inductor, so that the third current flows in the inductor; and when the third current reaches another preset level, transferring power to the load through a fourth conduction path comprising the fourth switching element, the capacitor, the second switching element and the inductor, so that the capacitor is discharged and the fourth current flows in the inductor.

21. The method according to claim 20, further comprising:
forming the third conduction path by turning on first, second and fourth switching elements and turning off the third switching element; and
forming the fourth conduction path by turning on the second and fourth switching elements and turning off the first and third switching elements.

22. The method according to claim 17, wherein the power conversion circuit further comprises a fifth switching element having a pair of fifth terminals and a fifth control terminal, wherein the pair of fifth terminals is connected between the input terminal and the second node, and the fifth switching element is controlled to be switched ON/OFF by the controller through the fifth control terminal, wherein the method further comprises:

transferring power to the load through a first conduction path comprising the fifth switching element and the inductor, so that the first current flows in the inductor; and when the first current reaches a preset level, transferring power to the load through a second conduction path comprising the first switching element, the capacitor, the third switching element and the inductor, so that the capacitor is charged and the second current flows in the inductor.

23. The method according to claim 22, further comprising:
forming the first conduction path by turning on the fifth switching element; and
forming the second conduction path by turning on the first and third switching elements and turning off the second, fourth and fifth switching elements.

24. The method according to claim 22, further comprising:

entering a standby state by isolating the second node from the input terminal when a current in the inductor is approximately zero;

when a voltage across the pair of the second terminals of the second switching element is less than a voltage threshold during the standby state, transferring power to the load through a third conduction path comprising the fifth switching element and the inductor, so that the third current flows in the inductor; and when the third current reaches another preset level, transferring power to the load through a fourth conduction path comprising the fourth switching element, the capacitor, the second switching element and the inductor, so that the capacitor is discharged and the fourth current flows in the inductor.

25. The method according to claim 24, further comprising:
forming the third conduction path by turning on fifth switching element and turning off the first to fourth switching elements; and
forming the fourth conduction path by turning on the second and fourth switching elements and turning off the first, third and fifth switching elements.

26. The method according to claim 17, further comprising:
performing a switching sequence in response to a command for a DVFS operation, comprising:
sinking power from the load through a first conduction path comprising the inductor and the third and fourth switching elements when the voltage at the load exceeds a voltage threshold, so that the first current flows in the inductor; and
when the first current reaches a preset level, sinking power from the load through a second conduction path comprising the inductor, the second switching element, the capacitor and the forth switching element, so that the second current flows in the inductor.

27. The method according to claim 26, further comprising:
forming the first conduction path by turning on the second to fourth switching elements and turning off the first switching element; and
forming the second conduction path by turning on the second and fourth switching elements and turning off the first and third switching elements.

28. The method according to claim 26, further comprising:
- entering a standby state by isolating the second node from the input terminal when a current in the inductor is approximately zero;
- when the voltage at the load is greater than another voltage threshold during the standby state, sinking power from the load through a third conduction path comprising the inductor and the third and fourth switching elements, so that the third current flows in the inductor; and
- when the third current reaches another preset level, sinking power from the load through a fourth conduction path comprising the inductor, the third switching element, the capacitor and the first switching element, so that the fourth current flows in the inductor.

29. The method according to claim 28, further comprising:
- forming the third conduction path by turning on the third and fourth switching elements and turning off the first and second switching elements; and
- forming the fourth conduction path by turning on the first and third switching elements and turning off the second and fourth switching elements.

30. The method according to claim 17, further comprising:
- performing a switching sequence in response to a command for a light load operation, comprising:
  - transferring power to the load through the first and second switching elements and the inductor during a first period of time; and
  - transferring power to the load through the third and fourth switching elements and the inductor during a second period of time which is different and not overlapped with the first period of time.

31. The method according to claim 30, further comprising:
- turning on the first, second and fourth switching elements and turning off the third switching element in the first period of time; and
- turning on the first, third and fourth switching elements and turning off the second switching element in the second period of time.

* * * * *